US012185192B2

(12) United States Patent
Cudak et al.

(10) Patent No.: US 12,185,192 B2
(45) Date of Patent: Dec. 31, 2024

(54) COMMUNICATION REQUEST NOTIFICATION EXTENSION

(71) Applicant: Lenovo (Singapore) Pte. Ltd., Singapore (SG)

(72) Inventors: Gary D Cudak, Wake Forest, NC (US); John M Petersen, Wake Forest, NC (US); Nathan Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 261 days.

(21) Appl. No.: 17/699,322

(22) Filed: Mar. 21, 2022

(65) Prior Publication Data
US 2023/0300569 A1    Sep. 21, 2023

(51) Int. Cl.
*H04W 4/16*     (2009.01)
*H04L 67/50*    (2022.01)
*H04W 4/029*    (2018.01)
*G06N 20/00*    (2019.01)

(52) U.S. Cl.
CPC .......... *H04W 4/029* (2018.02); *H04L 67/535* (2022.05); *H04W 4/16* (2013.01); *G06N 20/00* (2019.01)

(58) Field of Classification Search
CPC ...... H04W 4/029; H04W 4/16; H04L 67/535; G06N 20/00
See application file for complete search history.

(56) References Cited

U.S. PATENT DOCUMENTS

| 8,644,887 B1* | 2/2014 | Weksler | H04M 3/42357 |
| | | | 455/418 |
| 9,282,538 B2* | 3/2016 | Weksler | H04M 19/04 |
| 9,661,135 B1* | 5/2017 | Burns | H04W 4/16 |
| 2008/0037743 A1* | 2/2008 | Bishop | H04M 3/428 |
| | | | 379/201.01 |
| 2010/0056226 A1* | 3/2010 | Bansal | H04M 1/724 |
| | | | 455/567 |

FOREIGN PATENT DOCUMENTS

WO    WO-2014189665 A1 *    11/2014    .......... G06F 1/1694

* cited by examiner

*Primary Examiner* — Siu M Lee
(74) *Attorney, Agent, or Firm* — FERENCE & ASSOCIATES LLC

(57) ABSTRACT

One embodiment provides a method, the method including: detecting, using a notification extension system, an incoming communication request on an information handling device; identifying, using the notification extension system, an environmental context of a user with respect to the information handling device; determining, using the notification extension system and based upon the environmental context of the user, the user is unable to answer the incoming communication request within a default communication request notification length; and extending, using the notification extension system, based upon the environmental context of the user, and responsive to determining the user is unable to answer the incoming communication request, a length of the communication request notification.

18 Claims, 3 Drawing Sheets

COMMUNICATION REQUEST NOTIFICATION EXTENSION

BACKGROUND

With more and more people working remotely, the use of communication applications and meeting applications has increased. These applications are installed on an information handling device (e.g., computer system, smartphone, tablet, etc.) and utilize the Internet or other wireless connection as the communication transmission medium. Additionally, companies and other entities are frequently moving from hardwired telephone systems to voice-over-Internet-protocol (VOIP) systems. The use of these communication/meeting applications and VOIP systems typically adds extra steps when answering an incoming communication request. Additionally, since the applications transmit the communication over the Internet, different modes of communication are possible, for example, video calls, audio calls, and the like.

BRIEF SUMMARY

In summary, one aspect provides a method, the method including: detecting, using a notification extension system, an incoming communication request on an information handling device; identifying, using the notification extension system, an environmental context of a user with respect to the information handling device; determining, using the notification extension system and based upon the environmental context of the user, the user is unable to answer the incoming communication request within a default communication request notification length; and extending, using the notification extension system, based upon the environmental context of the user, and responsive to determining the user is unable to answer the incoming communication request, a length of the communication request notification.

Another aspect provides an information handling device, the information handling device including: a processor; a memory device that stores instructions that, when executed by the processor, causes the information handling device to: detect, using a notification extension system, an incoming communication request on the information handling device; identify, using the notification extension system, an environmental context of a user with respect to the information handling device; determine, using the notification extension system and based upon the environmental context of the user, the user is unable to answer the incoming communication request within a default communication request notification length; and extend, using the notification extension system, based upon the environmental context of the user, and responsive to determining the user is unable to answer the incoming communication request, a length of the communication request notification.

A further aspect provides a product, the product including: a computer-readable storage device that stores executable code that, when executed by a processor, causes the product to: detect, using a notification extension system, an incoming communication request on the information handling device; identify, using the notification extension system, an environmental context of a user with respect to the information handling device; determine, using the notification extension system and based upon the environmental context of the user, the user is unable to answer the incoming communication request within a default communication request notification length; and extend, using the notification extension system, based upon the environmental context of the user, and responsive to determining the user is unable to answer the incoming communication request, a length of the communication request notification.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
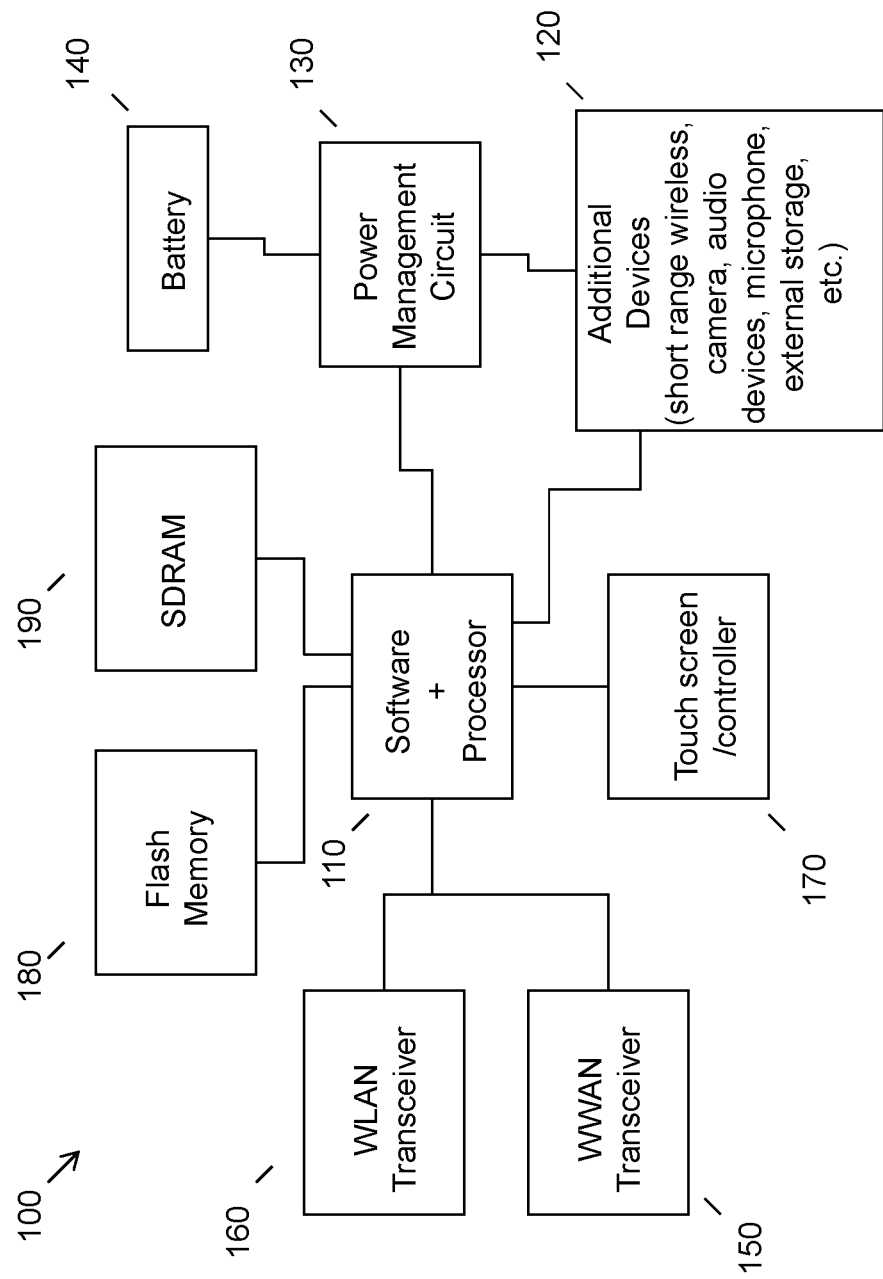
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While it is desirable to be able to communicate with others using different modes of communication and using applications information handling devices, it can increase the length of time it takes a user to answer an incoming communication request. Many applications require the user to take additional steps to answer a call rather than simply answering the call. For example, the user may have to put on or adjust a headset and then press a button to answer the communication request. As another example, the user may have to wake the information handling device and provide an input to answer the communication request. Also, since many of these devices are used because a user is working remotely, the user may be away from the device when the communication request comes in. In the time it takes the user to get situated to answer the communication request, the request may have ended. This causes the user to have to take additional steps to call the requestor back or send a message that they are now available.

While conventional techniques may provide a notification that a communication request was missed, the conventional techniques do not provide a technique for extending the length of the notification corresponding to the communication request. Rather, the length of the notification (e.g., the number of rings, the time the notification rings or is visible, etc.) is set to a default value. While a user can change the settings to lengthen this notification time, the notification time is set for each communication request that is received and does not vary depending on the request type and/or an environmental context of the user. Additionally, the person who is sending the communication request does not know if the user is unavailable or is attempting to answer the request.

Accordingly, the described system and method provides a technique for extending a length of an incoming communication request notification based upon an environmental context of the user with respect to the device receiving the incoming communication request. A notification extension system detects an incoming communication request on an information handling device. The communication request may be received through an application of the device, for example, a call application, a meetings application, a video call application, or the like. The communication request may also be of different types, for example, a simple phone call, a video call, or the like.

In response to detecting the communication request, the notification extension system identifies an environmental context of a user with respect to the information handling device receiving the request. The environmental context may identify a current activity of the user, a distance of a user from the device, a location of the user with respect to the device, and/or the like. Based upon the environmental context, the system determines the user is unable to answer the incoming communication request within a default notification length. In other words, the system determines that the user will be unable to get the request answer in the length of time that the notification is usually active. In response to determining the user will be unable to answer the request quickly enough before it ends, the system extends the length of the notification. The length of time that the notification is extended for may be based upon one or more factors, for example, the type of the incoming communication, the environmental context of the user, and the like. Thus, the length of time that the notification is extended for may vary from request to request based upon the different factors.

Therefore, a system provides a technical improvement over traditional methods for incoming communication notifications. The described system is able to extend the length of a notification corresponding to a communication request based upon an environmental context of the user. The length of the notification may also be extended based upon a type of the communication request, since different communications request types may require different actions by the user. Thus, the described system allows for extending the notification which is not possible using conventional systems. Additionally, since the notification length is based upon the environmental context and/or the communication type, the notification length can be dynamically changed for each request that is received, unlike conventional techniques where the notification length is set to a single value for all requests. Additionally, the system notifies the requestor that the notification length has been extended to allow the user time to answer the request, which is not performed by the conventional systems. Accordingly, the described system provides a user to receive notifications regarding communication requests in a manner that allows the user to answer the request while it is being received without having to call the requestor back and the requestor is notified that the user is attempting to answer the request, thereby saving time for both the user and the requestor.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
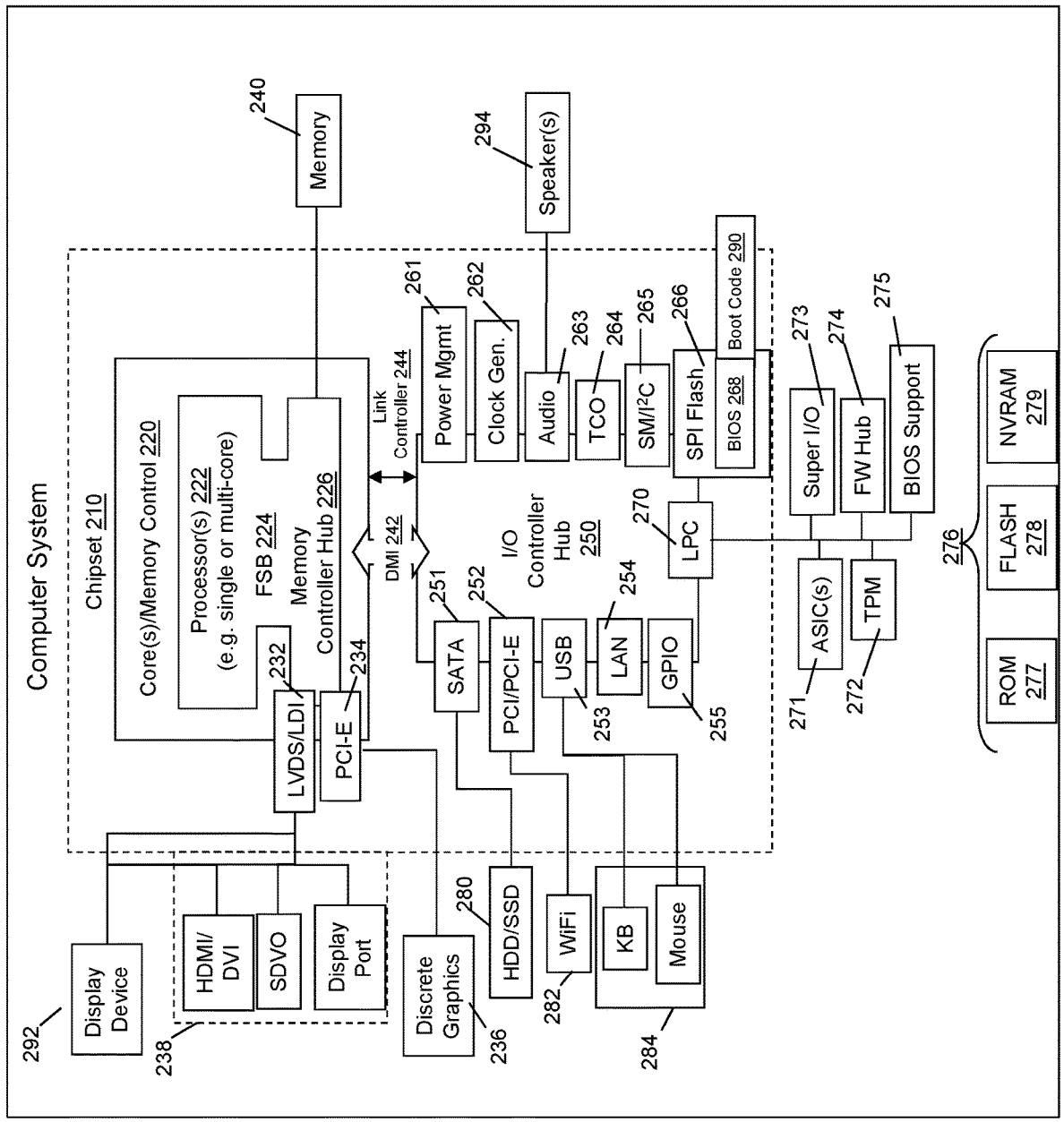
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for extending a notification length for a communication request. For example, the circuitry outlined in FIG. 1 may be implemented in a tablet or smart phone embodiment, whereas the circuitry outlined in FIG. 2 may be implemented in a personal computer embodiment.

Figure 3:
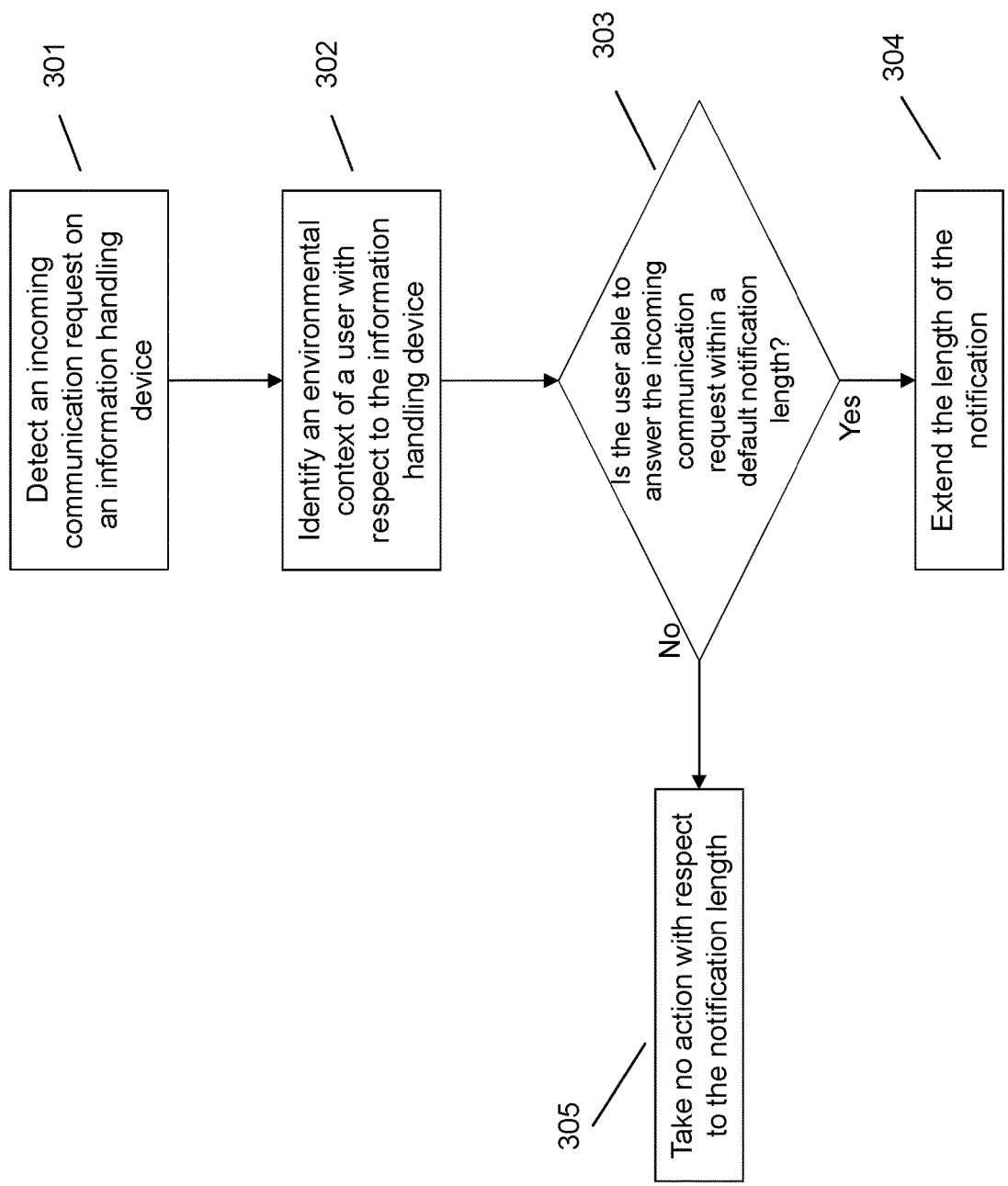
FIG. 3 illustrates an example method for extending a length of an incoming communication request notification based upon an environmental context of the user with respect to the device receiving the incoming communication request.

FIG. 3 illustrates an example method for extending a length of an incoming communication request notification based upon an environmental context of the user with respect to the device receiving the incoming communication request. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to extend a communication notification length based upon an environmental context of a user. Additionally, the notification extension system includes modules and features that are unique to the described system.

At 301, the notification extension system detects an incoming communication request on an information handling device. For ease of readability, the incoming communication request will be referred to herein as a call. However, this is not intended to limit this disclosure to only a call, as other communication requests can employ the described system, for example, spontaneous meeting requests, group communications, and the like. Additionally, a call may be a telephone call, video call, meeting request call, or other type of call. Additionally, for ease of readability, the example information handling device used here throughout will be a computer or other similar computing system. However, this is not intended to limit the disclosure to only a computer system as other devices, for example, smart phones, tablet, smart watches, smart TVs, smart boards or projectors, and the like, can be utilized in the described system.

The incoming communication request may be received through an application on the information handling device. The application may be a call application that simply allows for incoming and outgoing calls. The application may also be an application that provides more functionality, for example, video calls, screen sharing, and the like. Thus, the application may be a dedicated call application, meeting application, video call application, or any other type of application that allows for real-time communication between a user and a requestor. For ease of readability, the person receiving the communication request will be referred to as the user and the person sending the communication request will be referred to as the requestor.

The notification extension system may integral to the call application, for example, as an add-on extension, or may be a stand-alone application that is able to communicate with and provide instructions to the call application. Additionally, or alternatively, the notification extension system may be a combination of stand-alone application and call application extension. In this scenario, a small part of the system may be integrated into the call application and the processing and analysis part of the system may be a stand-alone application. This combination may prevent the notification extension system from slowing down the call application by requiring the call application to support and run the analysis and processing of the notification extension system.

At 302 the notification extension system identifies an environmental context of the user (i.e., the person receiving the communication request) with respect to the information handling device. The environmental context essentially identifies an ability of the user to answer the incoming communication request within a predetermined time, specifically, the default time that a notification of the incoming communication request will be active. In other words, the environment context defines what the user is doing and where the user is located with respect to the information handling device, thereby defining the ability of the user to answer the call within a particular length of time. Thus, the environmental context may be an activity being performed by the user, a distance of the user from the device, a location of the user within the environment with respect to the device, and the like. Accordingly, the notification extension system may employ one or more sensors to monitor and/or track the user within the environment. The sensors may be integral to or operatively coupled to the information handling device and/or notification extension device, if different than the information handling device. Additionally, or alternatively, the sensors may be operatively coupled to or communicate with another device that is in communication with the information handling device and/or notification extension device, if different than the information handling device, for example, devices within an Internet of Things (IoT) system.

Some example sensors may include motion sensors, proximity sensors, distance sensors, device sensors, image capture devices, microphones, speakers, and the like. As an example use case, when the call is received the user may be away from the computer getting a drink out of the refrigerator. The user can hear the notification, but is far enough from the computer that they will not be able to answer before the notification stops. To identify that the user is at the refrigerator, the system may utilize a sensor on the refrigerator that identifies that the refrigerator door is open, an image capture device to identify that the user is in the kitchen, and a proximity sensor to determine the user is away from the computer. As another example use case, when a video call request is received, the system may detect that the user is not wearing appropriate clothing for the video call using an image capture device.

Thus, the system may employ and utilize any sensors that are accessible to the system that may assist in determining an environmental context of the user. Identifying an environmental context may include identifying a location of the user within the environment with respect to the information handling device, for example, a distance between the user and the device, whether the user is in a location that would prevent the user from hearing the notification (e.g., there are walls and/or floors between the user and the device, whether there are other sounds that may make the notification hard to hear, etc.), an activity being performed by the user, and/or the like.

At 303, the notification extension system determines, based upon the environmental context of the user, whether the user is unable to answer the incoming communication request within a default communication request notification length. In other words, the system determines if the user is able to answer the call before the notification corresponding to the call ends. To determine if the user is able to answer the call before the notification ends, the system may utilize one or more algorithms. The one or more algorithms allow the system to make correlations between environmental contexts (e.g., activities, distances, locations, etc.) and a length of time it takes a user to answer a call for that environmental context. The determination may be unique to the user employing the system. In other words, while in one environmental context one user could answer the call, in the same environmental context a different user would not be able to answer the call. Thus, when the system is able, the determination is unique to the user. The system may not be able to make a unique determination if the system does not have a history of the user in a particular or similar environmental context.

One algorithm that the system may employ is a simple calculation. The system may determine the distance a user is from the device. Based upon historical information, the system may know how long it takes the user to traverse the distance. The distance may be determined using a distance sensor or may be calculated from a position of the user. The distance calculation may take into account a path that the user has to traverse to reach the device instead of a direct distance. In other words, the system can take into account if the user has to go around objects, go to a doorway to move between rooms, go up or down stairs, and the like.

In addition to the distance, the system may take into account any actions that the user has to perform to answer the call. For example, if the user has to don and adjust a headset, the system takes into account the time it takes to perform this task. As another example, if the user was washing their hands and now has to dry their hands, the system make take into account the time it takes to dry their hands. The system may have default time values for particular or common tasks. Additionally, or alternatively, to determine how long a task takes, the system may employ a learning algorithm that learns how long it takes the user to perform tasks. Thus, the system may monitor the user as the user performs tasks to determine how long it takes the user to perform the task. The data captured during the monitoring may then be used to update stored or default information regarding time for tasks.

The system may also employ a crowd-sourcing algorithm where crowd-sourced information is utilized to determine a length of time to perform a task and/or to make correlations between environmental contexts and lengths of times that users have take to answer a call for an environmental context. The crowd-sourced information may be frequently updated with new or updated information. Additionally, the crowd-sourced information may be sorted or filtered based upon characteristics of the user and users making up the crowd-sourced information. Characteristics may include characteristics of the user (e.g., age, geographical location or region, gender, etc.), characteristics of the environment (e.g., size or layout of an environment, other people within the environment, etc.), characteristics of the device (e.g., the application, call type, components installed on the device, etc.), or any other characteristics that may impact how long it takes a user to answer a call for an environmental context.

Another algorithm that the system may employ is a machine-learning model or algorithm. The machine-learning model can be trained using historical information that identifies a length of time to perform a task and/or identifies environmental contexts (e.g., activities, distances, locations, etc.) of the user and lengths of time to answer a call that correspond to these environmental contexts of the user. As the user utilizes the notification extension system, the machine-learning model can automatically ingest information related to environmental contexts of the user and lengths of time to answer a call correlating to the environmental contexts to further refine the machine-learning model. The model may also take into account other information, for example, characteristics of the device, characteristics of the user, characteristics of the environment, and the like. Thus, the machine-learning model may be trained to be unique to the user.

Once the system determines how long it will take the user to answer the call, the system can compare this length of time to the default communication request notification length. In other words, the system compares the length of time it expects the user will take to answer the call to the length of time the notification is set to be active. If the calculated length of time is greater than the default length of time, the system may determine the user will be unable to answer the call in the default length of time. If, on the other hand, the calculated length of time is less than the default length of time, the system may determine the user will be able to answer the call in the default length of time. If the calculated length of time is equal to the default length of time, the system may determine that the user may or may not make it to the answer the call in the default length of time.

If the system determines that the user will be able to answer the call in the default time at 303, the notification extension system may take no action with respect to the notification length at 305. The system may also take no action if the calculated length of time is equal to the default length of time. However, whether the system takes an action in this scenario may be chosen by the user. The system may also default to a conservative action, which would be to extend the length of the notification at 304. The system may also extend the notification at 304 if the system determines that the user will be unable to answer the call in the default notification length of time. In other words, at 304, the notification extension system extends, based upon the environmental context of the user, and responsive to determining the user is unable to answer the incoming communication request, a length of the communication request notification.

Extending the length of the notification includes extending the time that the notification is active, thereby allowing the user additional time to answer the call. The time length of extension may be a default value, for example, a particular number of rings, a particular time length, or the like. On the other hand, the time length of extension may be different for different environmental contexts of the user. In other words, depending on what the user is doing, where the user is located within an environment, a position of the user with respect to the device, and the like, the time length of extension may vary. Thus, the length of time extension is dynamic for different environmental contexts. Additionally, or alternatively, the length of time extension may be unique to the user. Thus, the length of time extension is based upon information of the user, thereby providing an individualized length of time extension.

The length of time extension may also be based upon other factors, for example, a type of the incoming communication. Different communication types (e.g., video call, meeting call request, telephone call, etc.) may require the user to be in different levels of preparedness. For example, a video call may require the user to be dressed in a particular way. If the user is not properly dressed, answering the video call can entail getting properly dressed, thereby extending the amount of time a user needs to answer the video call. However, if, in the same scenario, the call were a simple telephone call, the user does not have to get properly dressed and can answer the call more quickly. Thus, different communication types may require different length of time extensions for the notification.

The algorithms used to make the determination regarding whether a user is able to answer the call in the default time may also provide input into how long the length of time extension should be. Since the determination provides a calculated length of time for the user to answer the call, the system may use this calculated value to extend the communication notification time to or past the calculated value. For example, if the machine-learning algorithm determined that it will take the user an additional five second above the default value to answer the call, the system may extend the notification active time an additional five seconds. The system may also extend the notification active time for the calculated value plus a buffer value, for example, one second, two seconds, or the like. Thus, using the previous example plus a buffer value of two seconds, the system would extend the notification active time seven seconds (i.e., five second for the calculated value plus two seconds for the buffer value). Accordingly, the machine-learning model, crowd-sourced information, and other algorithms used in the determination step may provide input or identify a length of time for the notification extension.

In addition to extending the notification, the notification extension system may also notify the requestor that the notification active time is being extended. This allows the requestor to know to stay on the call as it is ringing and not hang up prematurely. In other words, this provides an indication to the requestor that the user is actively trying to answer the call, but it is taking longer than normal to do so. This prevents the requestor from hanging up or assuming the user is unavailable to answer the communication request. The system may also notify the requestor of the expected time that the user will answer the call. This notification information can be based upon the calculated values and how long the system has extended the notification for.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   detecting, using a notification extension system, an incoming communication request on an information handling device;
   identifying, using the notification extension system, an environmental context of a user with respect to the information handling device;
   determining, using the notification extension system and based upon the environmental context of the user, the user is unable to answer the incoming communication request within a default communication request notification length; and
   extending, using the notification extension system, based upon the environmental context of the user, and responsive to determining the user is unable to answer the incoming communication request, a length of the communication request notification, wherein a length of the extension of the communication request notification is different for different communication types corresponding to the incoming communication request.

2. The method of claim 1, wherein the identifying the environmental context of the user comprises identifying, using one or more sensors, a location of the user within an environment with respect to the information handling device.

3. The method of claim 1, wherein the identifying the environmental context of the user comprise identifying, utilizing one or more sensors, an activity of the user within an environment.

4. The method of claim 1, wherein a length of the extension of the communication request notification is unique to the user.

5. The method of claim 1, further comprising providing a notification to a user sending the incoming communication request that the length of the notification has been extended.

6. The method of claim 1, wherein the determining comprises utilizing a machine-learning model to determine that the user will be unable to answer the incoming communication request within the default communication request notification length.

7. The method of claim 6, wherein the machine-learning model identifies a length of the extension of the communication request notification.

8. The method of claim 1, wherein the incoming communication request comprises a communication request through a communication application installed on the information handling device.

9. The method of claim 1, wherein a length of the extension of the communication request notification is different for different environmental contexts of the user.

10. An information handling device, the information handling device comprising:
    a processor;
    a memory device that stores instructions that, when executed by the processor, causes the information handling device to:
    detect, using a notification extension system, an incoming communication request on the information handling device;
    identify, using the notification extension system, an environmental context of a user with respect to the information handling device;
    determine, using the notification extension system and based upon the environmental context of the user, the user is unable to answer the incoming communication request within a default communication request notification length; and
    extend, using the notification extension system, based upon the environmental context of the user, and responsive to determining the user is unable to answer the incoming communication request, a length of the communication request notification, wherein a length of the extension of the communication request notification is different for different communication types corresponding to the incoming communication request.

11. The information handling device of claim 10, wherein the identifying the environmental context of the user comprise identifying, using one or more sensors, a location of the user within an environment with respect to the information handling device.

12. The information handling device of claim 10, wherein the identifying the environmental context of the user comprise identifying, utilizing one or more sensors, an activity of the user within an environment.

13. The information handling device of claim 10, wherein a length of the extension of the communication request notification is unique to the user.

14. The information handling device of claim 10, further comprising providing a notification to a user sending the incoming communication request that the length of the notification has been extended.

15. The information handling device of claim 10, wherein the determining comprises utilizing a machine-learning model to determine that the user will be unable to answer the incoming communication request within the default communication request notification length; and wherein the machine-learning model identifies a length of the extension of the communication request notification.

16. The information handling device of claim 10, wherein the incoming communication request comprises a communication request through a communication application installed on the information handling device.

17. The information handling device of claim 10, wherein a length of the extension of the communication request notification is different for different environmental contexts of the user.

18. A product, the product comprising:

a computer-readable storage device that stores executable code that, when executed by a processor, causes the product to:

detect, using a notification extension system, an incoming communication request on an information handling device;

identify, using the notification extension system, an environmental context of a user with respect to the information handling device;

determine, using the notification extension system and based upon the environmental context of the user, the user is unable to answer the incoming communication request within a default communication request notification length; and extend, using the notification extension system, based upon the environmental context of the user, and responsive to determining the user is unable to answer the incoming communication request, a length of the communication request notification, wherein a length of the extension of the communication request notification is different for different communication types corresponding to the incoming communication request.

* * * * *